(12) United States Patent
Depraete (10) Patent No.: US 9,909,658 B2
(45) Date of Patent: Mar. 6, 2018

(54) HYDROKINETIC TORQUE COUPLING DEVICE FOR A MOTOR VEHICLE

(71) Applicant: VALEO EMBRAYAGES, Amiens (FR)

(72) Inventor: Alexandre Depraete, Bloomfield, MI (US)

(73) Assignee: Valeo Embrayages (FR)

( * ) Notice: Subject to any disclaimer, the term of this patent is extended or adjusted under 35 U.S.C. 154(b) by 140 days.

(21) Appl. No.: 14/942,621

(22) Filed: Nov. 16, 2015

(65) Prior Publication Data

US 2017/0138454 A1    May 18, 2017

(51) Int. Cl.
  *F16H 41/24*    (2006.01)
  *F16H 45/02*    (2006.01)
  *F16F 15/123*   (2006.01)

(52) U.S. Cl.
  CPC .......... *F16H 41/24* (2013.01); *F16F 15/123* (2013.01); *F16H 45/02* (2013.01); *F16H 2045/0205* (2013.01); *F16H 2045/0221* (2013.01)

(58) Field of Classification Search
  None
  See application file for complete search history.

(56) References Cited

U.S. PATENT DOCUMENTS

| | | | | |
|---|---|---|---|---|
| 4,027,757 A | * | 6/1977 | Radke | F16F 15/12313 192/213.31 |
| 7,445,099 B2 | * | 11/2008 | Maucher | F16D 47/06 192/3.26 |
| 2013/0230385 A1 | * | 9/2013 | Lindemann | F16D 33/18 415/122.1 |
| 2014/0097055 A1 | * | 4/2014 | Lindemann | F16H 41/24 192/3.21 |
| 2015/0021135 A1 | | 1/2015 | Jameson | |
| 2015/0027110 A1 | | 1/2015 | Lindemann et al. | |
| 2015/0068857 A1 | * | 3/2015 | Lindemann | F16D 33/18 192/3.28 |
| 2015/0198064 A1 | * | 7/2015 | Schrader | F16H 41/04 415/1 |

* cited by examiner

*Primary Examiner* — Mark A Manley
(74) *Attorney, Agent, or Firm* — Berenato & White, LLC (57) ABSTRACT

A hydrokinetic torque coupling device for a motor vehicle comprises an impeller wheel intended to be coupled to a crankshaft and adapted to hydrokinetically rotate a turbine wheel. The impeller wheel rotationally coupled to a cover at least partially accommodating the impeller wheel, the turbine wheel and the reactor. The turbine wheel is axially moves between an engaged position in which the turbine wheel and the impeller wheel are axially moved closer to each other and rotationally coupled together, and a disengaged position in which the turbine wheel and the impeller wheel are axially moved away from each other and rotationally uncoupled. The device comprises a bracing member axially extending between the turbine wheel and a part of the cover, with the bracing member being adapted to limit the axial motion of the turbine wheel toward the above-mentioned part of the cover, opposite the turbine wheel.

12 Claims, 5 Drawing Sheets

HYDROKINETIC TORQUE COUPLING DEVICE FOR A MOTOR VEHICLE

FIELD OF THE INVENTION

The present invention relates to a hydrokinetic torque coupling device for a motor vehicle, such as a torque converter, for instance.

BACKGROUND OF THE INVENTION

The patent application US 2015/0021135 discloses a hydrodynamic torque converter comprising an impeller wheel intended to be coupled to a crankshaft and adapted to hydrokinetically rotate a turbine wheel, through a reactor. The impeller wheel is rotationally coupled to a cover wherein the impeller wheel, the turbine wheel and/or the damping means are at least partially accommodated. The turbine wheel is adapted to be axially moved between an engaged position in which the turbine wheel and the impeller wheel are axially moved closer to each other and rotationally coupled together, and a disengaged position in which the turbine wheel and the impeller wheel are axially moved away from each other and rotationally uncoupled.

The hydrodynamic torque coupling device further comprises a hub intended to be coupled to a transmission input shaft, connected to the turbine wheel through damping means.

The damping means comprise an annular wheel disc integral with the hub, two guiding washers axially positioned on either side of the annular wheel disc, and first elastic members acting on the circumference mounted between the annular wheel disc and the guiding washers. The first elastic members are adapted to act against the pivoting of the guiding washers relative to the annular wheel disc. The damping means further comprise second elastic members acting onto the circumference and mounted between a linking member attached to the turbine wheel and one of the guiding washers. The second elastic members are adapted to oppose the pivoting of the guiding washers relative to the turbine wheel.

In operation, in the disengaged position of the turbine wheel, the torque is transmitted from the crankshaft of the vehicle engine to the cover and to the impeller wheel, with such torque being then transmitted to the turbine wheel through the hydrokinetic coupling means formed by the impeller wheel, the turbine wheel and the reactor. The torque is then transmitted to the hub through the damping means.

When the turbine wheel is in the engaged position, the torque is directly transmitted from the cover and from the impeller wheel to the turbine wheel, without any action from the hydrokinetic coupling means. The torque is then transmitted to the hub through the damping means.

The turbine wheel moving between the engaged and disengaged positions thereof thus makes it possible to activate or deactivate the hydrokinetic coupling.

Additionally, the torque converter is adapted to operate in a so-called direct mode, wherein the torque is transmitted from the impeller wheel to the turbine wheel. More specifically, in the disengaged position of the turbine wheel, i.e. when the hydrokinetic coupling is activated, the impeller wheel turns faster than the turbine wheel. Conversely, in a so-called back operation, the turbine wheel can turn faster than the impeller wheel.

The back operation mode is used for instance when the motor brake is used or when the user suddenly takes his/her foot off the accelerator pedal.

In some operation cases, specifically in the back mode and when the hydrokinetic coupling is activated, the turbine wheel may be axially pushed back opposite the impeller wheel. It is important to limit such a motion of the turbine wheel so as to prevent a possible damage to the torque converter and to enable the motion of the turbine wheel to the engaged position thereof, if necessary.

In the torque converter disclosed in the patent application US 2015/0021135, the radially internal periphery of one of the guiding washers comprises a large rest area adapted to rest on a radial part of the cover, so as to limit the motion of the turbine wheel-damping means assembly.

In this embodiment, the turbine wheel indirectly axially rests on the radial part of the cover through a large number of parts. The accurate position of the turbine wheel is not easily controlled because of the dimension tolerance of each part belonging to the corresponding chain of dimensions.

Besides, the large area whereon the mentioned above guiding washer rests on the cover generates a significant frictional torque in operation.

SUMMARY OF THE INVENTION

The invention more particularly aims at providing a simple, efficient and cost-effective solution to these problems.

For this purpose, it provides for a hydrokinetic torque coupling device for a motor vehicle, comprising an impeller wheel intended to be coupled to a crankshaft and adapted to hydrokinetically rotate a turbine wheel, with the impeller wheel being rotationally coupled to a cover at least partially accommodating the impeller wheel, the turbine wheel and the reactor, with the turbine wheel being adapted to be axially moved between an engaged position in which the turbine wheel and the impeller wheel are axially moved closer to each other and rotationally coupled together, and a disengaged position in which the turbine wheel and the impeller wheel are axially moved away from each other and rotationally uncoupled, characterized in that it comprises a bracing member axially extending between the turbine wheel and a part of the cover, with the bracing member being adapted to limit the axial motion of the turbine wheel toward the above-mentioned part of the cover, opposite the turbine wheel.

The motion of the turbine wheel can thus be limited by resting on the cover through only one part, i.e. the bracing member. The position of the turbine wheel can thus be accurately controlled.

The bracing member makes it possible to take over the stresses so as to limit the constraints exerted on the turbine wheel or on the damping means, and thus to increase the service life of the hydrokinetic coupling device.

Additionally, the dimensions of the rest area of the bracing member on the cover or on the turbine wheel can be so adjusted that friction is reduced. The materials used can of course also be chosen so as to reach this goal. The bracing member can be at least partly made of a polymer material, for instance and the cover or the turbine wheel can be made of metal, for instance.

It should be noted that a hydrokinetic torque coupling device may be a torque converter when the hydrokinetic torque coupling means comprise an impeller wheel, a turbine wheel and a reactor, or may be a coupler when the hydrokinetic torque coupling means have no reactor.

According to one embodiment, the bracing member may be attached to the cover, to a so-called attachment end, with the turbine wheel being adapted to rest on another so-called rest end of the bracing member.

According to another embodiment, the bracing member can be attached to a so-called attachment end of the turbine wheel, with another so-called rest end of the bracing member being adapted to rest on said part of the cover.

A pad or a rolling bearing washer can be mounted between the rest end of the bracing member, and the cover or the turbine wheel. This makes it possible to reduce friction in operation.

According to another embodiment, a support washer and a spacing washer can be mounted between the rest end of the bracing member, and the cover or the turbine wheel, with the support washer resting on the cover or the turbine wheel.

The support washer is made of a polymer material, for instance.

Besides, the spacing washer can be elastically deformable in the axial direction, so as to make up for the axial motion of the turbine wheel.

The support washer and the spacing washer may be rotationally coupled to the bracing member.

The hydrokinetic torque coupling device may comprise damping means mounted between the turbine wheel and a hub intended to be coupled to a transmission input shaft.

The damping means make it possible to filter the vibrations and the rotation acyclism.

More particularly, the damping means may comprise an annular wheel disc connected to the hub and a least one guiding washer connected to the turbine wheel, with at least a first elastic member acting on the circumference being mounted between the annular wheel disc and the guiding washer, with the first elastic member being adapted to oppose the rotation of the annular wheel disc relative to the guiding washer.

The damping means may also comprise at least one second elastic member mounted between the guiding washer and the turbine wheel, with the second elastic member being adapted to oppose the rotation of the turbine wheel relative to the guiding washer.

The damping means are thus of the LTD («Long Travel Damper») type and enable a significant displacement on the circumference, so as to improve the filtering quality of the damping means.

The annular wheel disc may comprise at least one oblong opening, for instance a semi-circular opening, gone through by the bracing member The oblong opening enables the displacement of the annular wheel disc and of the hub relative to the spacing member.

The bracing member may comprise an annular part from which at least one lug axially extends, with said lug going through the oblong opening of the annular wheel disc.

The hydrokinetic torque coupling device may also comprise one or more of the following characteristics:
  the impeller wheel is adapted to hydrokinetically rotate a turbine wheel, through a reactor,
  the annular wheel disc and the hub are integral with each other and form a single part.
  the bracing member is attached to the turbine wheel or to the cover by rivets, by welding, or by glueing.
  the turbine wheel comprises a radially external peripheral area, with said area being intended to rest on and rub a matching area of the impeller wheel or of the cover, when the turbine wheel is in the engaged position, so as to frictionally couple the turbine wheel and the impeller wheel;
  said external peripheral area of the turbine wheel comprises clutch lining,
  the bracing member comprises an annular area from which at least two lugs, for example four lugs, regularly distributed over the periphery, extend,
  the bracing member is formed in steel sheet, for example by drawing,
  the bracing member comprises radially extending areas which support the spacing washer,
  the areas supporting the spacing washer are formed by cutting and/or folding, with said bracing member being made from a steel sheet,
  the support washer and the spacing washer comprise notches for example located on the radially internal periphery thereof, with the lugs of the bracing member being engaged in said notches so as to provide a rotational coupling of said washers and bracing member.

BRIEF DESCRIPTION OF THE DRAWINGS

The invention will be better understood, and other details, characteristics and advantages of the invention will appear upon reading the following description given by way of a non restrictive example while referring to the appended drawings wherein.

DETAILED DESCRIPTION OF THE PREFERRED EMBODIMENT(S)

A hydrokinetic torque coupling device according to a first embodiment of the invention is shown in FIGS. 1 to 4. The hydrokinetic torque coupling device is more particularly a hydrodynamic torque converter.

Figure 1:
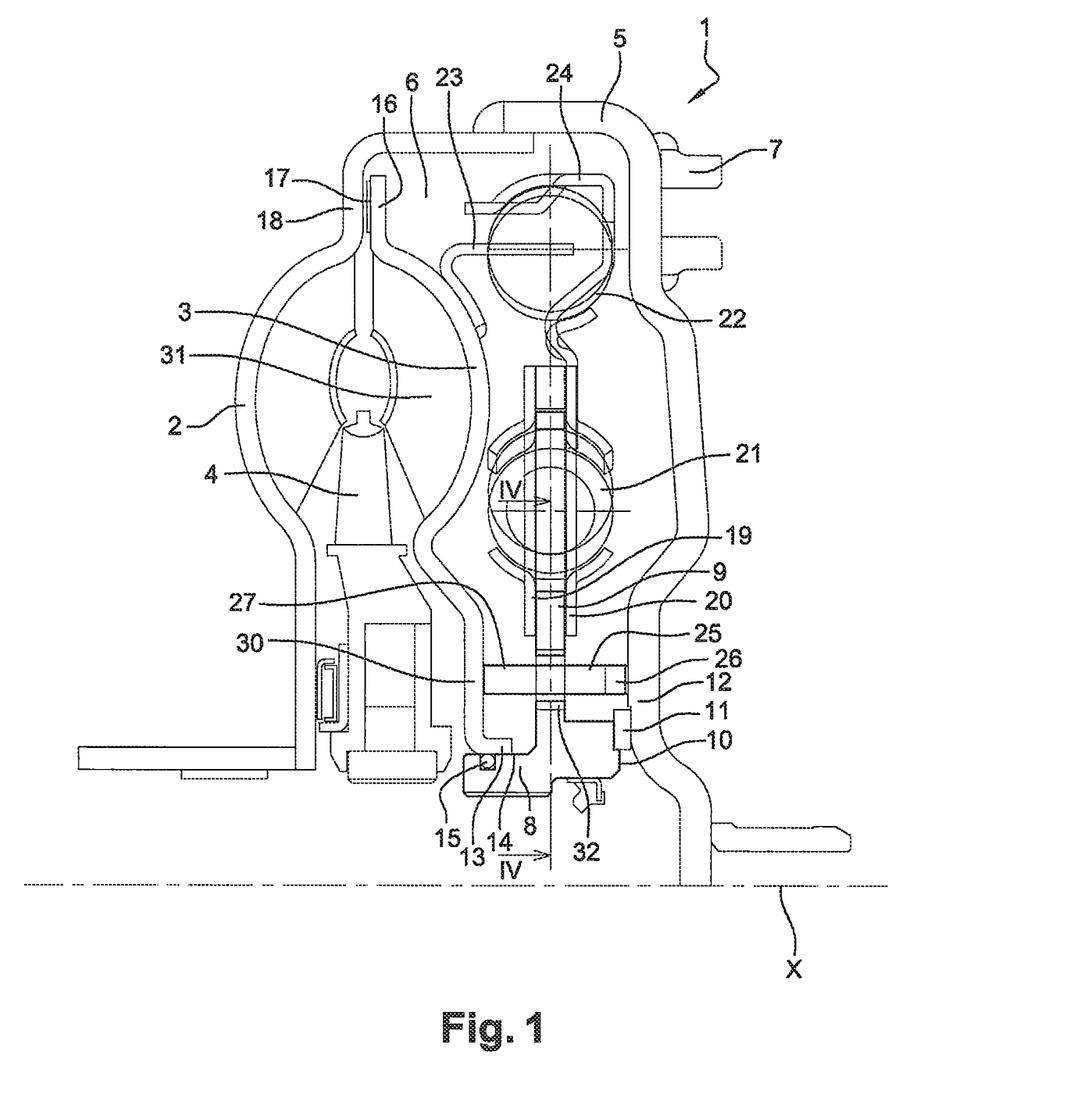
FIG. 1 is a half-sectional view along an axial plane, of a torque converter according to a first embodiment of the invention.

Such device makes it possible to transmit a torque from the output shaft of an internal combustion engine in a motor vehicle, such as for instance a crankshaft, to a transmission input shaft. The axis of the torque converter bears reference X.

In the following, the words "axial" and "radial" are defined relative to the X axis.

The torque converter 1 comprises an impeller bladed wheel 2, able to hydrokinetically drive a turbine bladed wheel 3 through a reactor 4.

The impeller wheel 2 is attached to a cover 5 by welding and defines with said cover 5 an internal volume 6 accommodating the impeller wheel 2, the turbine wheel 3 and the reactor 4. Said cover 5 comprises attaching means 7 making it possible to rotationally couple said cover 6 to the crankshaft.

The torque converter 1 further comprises a central hub 8, the radially internal periphery of which is ribbed, having an X axis and being accommodated in the internal volume 6. The central hub 8 comprises an annular rim 9 which radially extends outwards and a front end 10, facing the turbine wheel 3. A pad 11 adapted to limit friction and made of a synthetic material for instance, is inserted between the front end 10 of the hub 8 and a radial part 12 of the cover 5.

The turbine wheel 3 comprises a cylindrical rim 13 on the radially internal periphery thereof, mounted about a cylindrical part 14 formed at the back end of the hub 8. Said cylindrical part 14 comprises an O-ring 15 mounted in a groove of the hub 8. The turbine wheel 3 is adapted to axially move relative to said cylindrical part 14 of the hub 8.

The radially external periphery of the turbine wheel 3 comprises a radial area 16 fitted with clutch lining 17 adapted to rest on a radial area 18 of the impeller wheel 2.

The turbine wheel 3 is adapted to be axially moved between an engaged position in which the turbine wheel 3 and the impeller wheel 2 are axially moved closer to each other and rotationally coupled together, and a disengaged position in which the turbine wheel 3 and the impeller wheel 2 are axially moved away from each other and rotationally uncoupled.

The motion of the turbine wheel 3 is controlled by pressure chambers positioned on either side of the turbine wheel 3.

The turbine wheel 3 is rotationally coupled to the hub through damping means.

The damping means comprise an annular wheel disc 9 integral with the hub 8, two guiding washers 19, 20 axially positioned on either side of the annular wheel disc 9, and first elastic members 21 acting on the circumference mounted between the annular wheel disc 9 and the guiding washers 19, 20. The first elastic members 21 are adapted to act against the pivoting of the guiding washers 19, 20 relative to the annular wheel disc 9. The damping means further comprise second elastic members 22 acting on the circumference, mounted between a linking member 23 attached to the turbine wheel 3, for instance by welding, and the radially external periphery 24 of one of the guiding washers 19, 20, for instance the radially external periphery 24 of the guiding washer 20 opposite the turbine wheel 3. The second elastic members 22 are adapted to act against the pivoting of the guiding washers 19, 20 relative to the turbine wheel 3.

The first and second elastic members 21, 22 are for instance straight or curved coil compression springs.

In operation, in the disengaged position of the turbine wheel 3, the torque is transmitted from the crankshaft of the vehicle engine to the cover 5 and to the impeller wheel 2, with such torque being then transmitted to the turbine wheel 3 through the hydrokinetic coupling means formed by the impeller wheel 2, the turbine wheel 3 and the reactor 4. The torque is then transmitted to the hub 8 through the damping means 9, 19, 20, 21, 22.

When the turbine wheel 3 is in the engaged position, the torque is directly transmitted from the cover 5 and from the impeller wheel 2 to the turbine wheel 3, without any action from the hydrokinetic coupling means. The torque is then transmitted to the hub through the damping means 9, 19, 20, 21, 22.

The turbine wheel 3 moving between the engaged and disengaged positions thereof thus makes it possible to activate or deactivate the hydrokinetic coupling.

Additionally, the torque converter 1 is adapted to operate in a so-called direct mode, wherein the torque is transmitted from the impeller wheel 2 to the turbine wheel 3. More specifically, in the disengaged position of the turbine wheel 3, i.e. when the hydrokinetic coupling is activated, the impeller wheel 2 turns faster than the turbine wheel 3. Conversely, in a so-called back operation, the turbine wheel 3 can turn faster than the impeller wheel 2.

The back operation mode is used for instance when the motor brake is used or when the user suddenly takes his/her foot off the accelerator pedal.

In some operation cases, specifically in the back mode and when the hydrokinetic coupling is activated, the turbine wheel 3 may be axially pushed back opposite the impeller wheel 2. It is important to limit such a motion of the turbine wheel 3 so as to prevent a possible damage to the torque converter 1 and to enable the motion of the turbine wheel 3 to the engaged position thereof, if necessary.

For this purpose, the invention provides to mount a bracing member 25 axially extending between the impeller wheel 2 and the radial part 12 of the cover 5, with the bracing member 25 being adapted to limit the axial motion of the turbine wheel 3 towards the above-mentioned part 12 of the cover 5, opposite the impeller wheel 2.

Figures 2, 3:
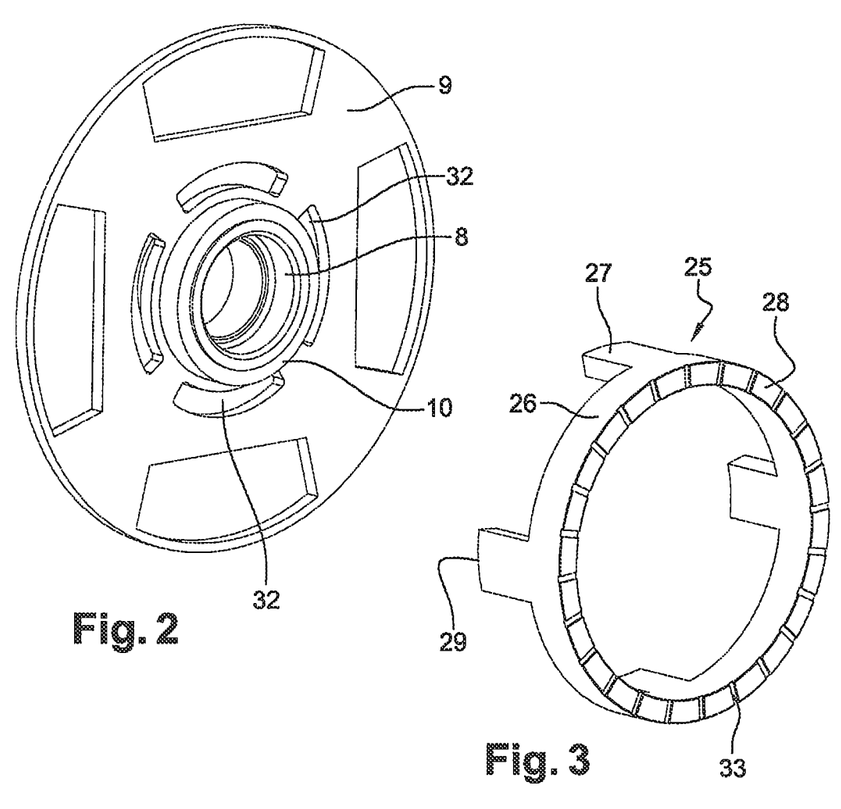
FIG. 2 is a perspective view of the annular wheel disc of the torque converter of FIG. 1.
FIG. 3 is a perspective view of the bracing member of the torque converter of FIG. 1.

As best seen in FIG. 3, the bracing member 25 consists of a single part and comprises a front annular part 26 from which lugs 27, for instance four lugs extend backwards. The front end 28 of the annular part 26 can be attached by glueing or by welding to the cover 5 for instance. The back ends 29 of the lugs 27, i.e. the free ends 29 of said lugs 27, are adapted to rest on a radial part 30 of the turbine wheel 3, radially positioned between the blades 31 of said turbine wheel 3 and the cylindrical rim 13.

If the turbine wheel 3 is pushed frontwards, in operation, opposite the impeller wheel 2, such a motion is limited by the turbine wheel 3 resting on the free ends 29 of the lugs 27 of the bracing member 25.

The lugs 27 may of course be attached to the turbine wheel 3 and the front end 28 of the annular part 26 may rest on the cover 5. According to an alternative embodiment of the invention, the annular part 26 may be positioned at the back and the lugs 17 may extend axially frontwards.

Figure 4:
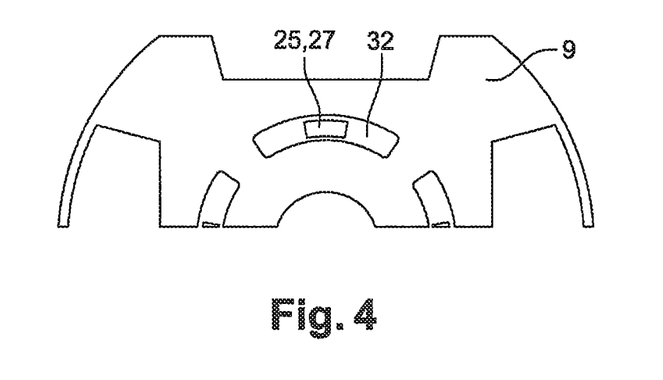
FIG. 4 is a sectional view along a part of the IV-IV plane of FIG. 1, showing the mounting of the lugs of the bracing member into the matching openings in the annular wheel disc.

As best seen in FIGS. 2 and 4, the annular wheel disc 9 comprises oblong, for instance semi-circular, openings 32 or holes, with each lug 27 of the bracing member 25 axially going through one of the openings 32 of the annular wheel disc 9.

The shapes and dimensions of the lugs 27 and the oblong openings 32 thus enable the annular wheel disc 9 to rotate relative to the bracing member 25, on an angular range at least equal to the required displacement of the damper. In the rest position, when no torque is transmitted through the damping means 9, 19, 20, 21, 22, 23, the lugs 27 are circumferentially centred in the oblong openings 32 of the annular wheel disc 9.

The ends 28, 29 of the annular part 26 or of the lugs 27, may also comprise lines 33, radial lines for instance or lines so oriented as to efficiently lubricate the friction area.

In this embodiment, the bracing member 25 is made of a polymer material, for instance, whereas the cover 5 and the turbine wheel 3 are made of metal, for instance. The contact at the rest position between the bracing member 25 and the cover 5 or the turbine wheel 3 is thus a contact of the polymer/metal type, with a low friction coefficient. The friction torque generated in operation is thus relatively low and thus does not affect or slightly affects the filtration quality obtained with the damping means.

The bracing member 25 also makes it possible to take over the stresses so as to limit the constraints exerted on the turbine wheel 3 or on the damping means 9, 19, 20, 21, 22, 23, and thus to increase the service life of the torque converter 1.

Additionally, the dimensions of the rest area of the bracing member 25 on the cover 5 or on the turbine wheel 3 can be so adjusted that friction is reduced.

Figure 5:
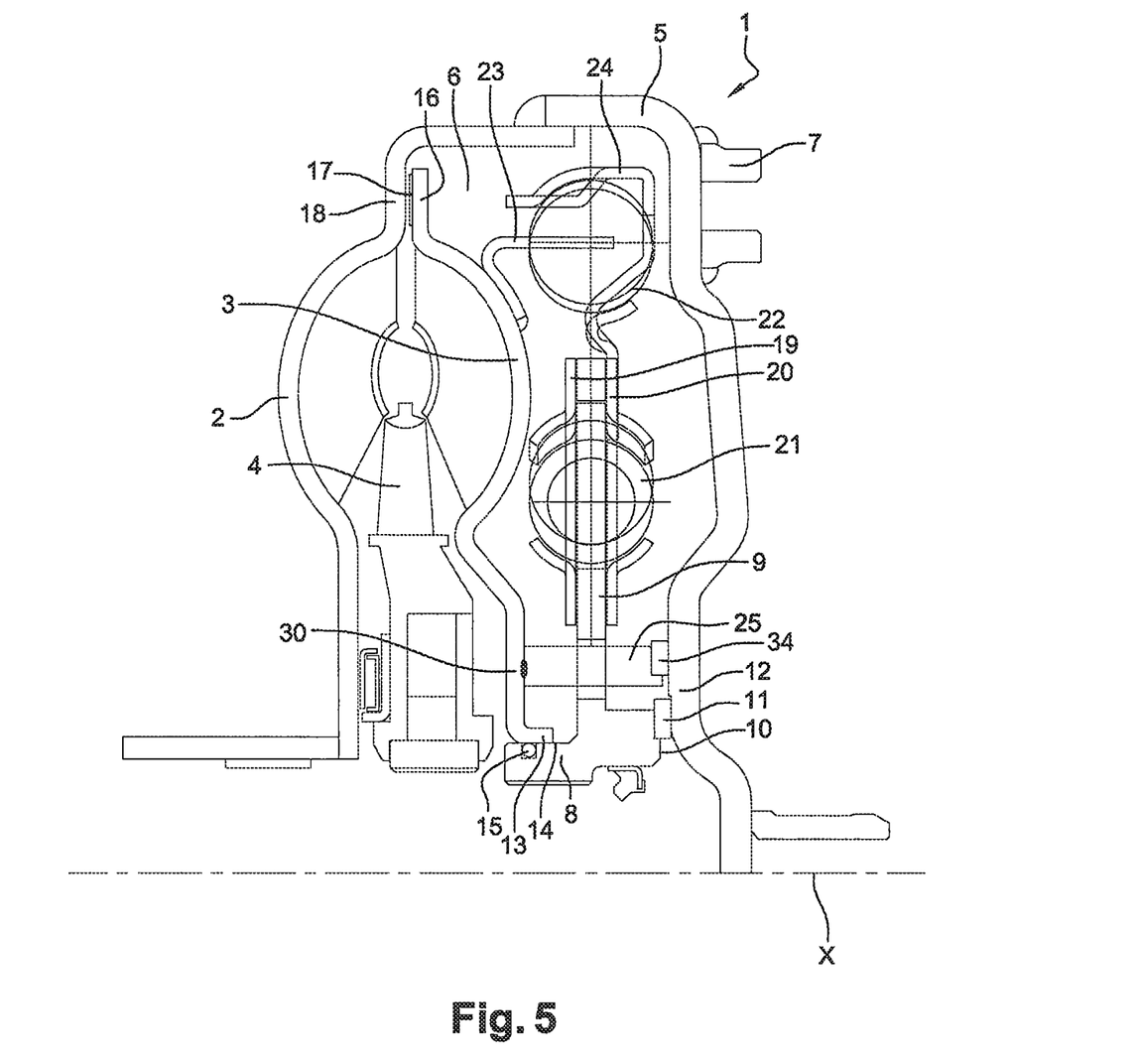
FIG. 5 is a view corresponding to FIG. 1, illustrating a second embodiment of the torque converter according to the invention.

FIG. 5 shows a torque converter 1 according to a second embodiment, which is different from the one described while referring to FIGS. 1 to 4 in that the back end of the bracing member 25 is attached to the turbine wheel 3. The bracing member 25 is for instance made of metal and is attached to the turbine wheel 3 by welding. A pad or a rolling bearing washer 34, for instance a needle thrust bearing is mounted between the front end of the bracing member 25 and the cover 5.

The front end of the bracing member 25 may of course be attached to the cover 5 and the pad or the rolling bearing washer 34, between the back end of the bracing member 25 and the turbine wheel 3. As mentioned above, the annular part 26 of the bracing member 25 may be positioned at the front or respectively at the back, with the lugs 27 being then positioned at the back or respectively at the front.

Figure 6:
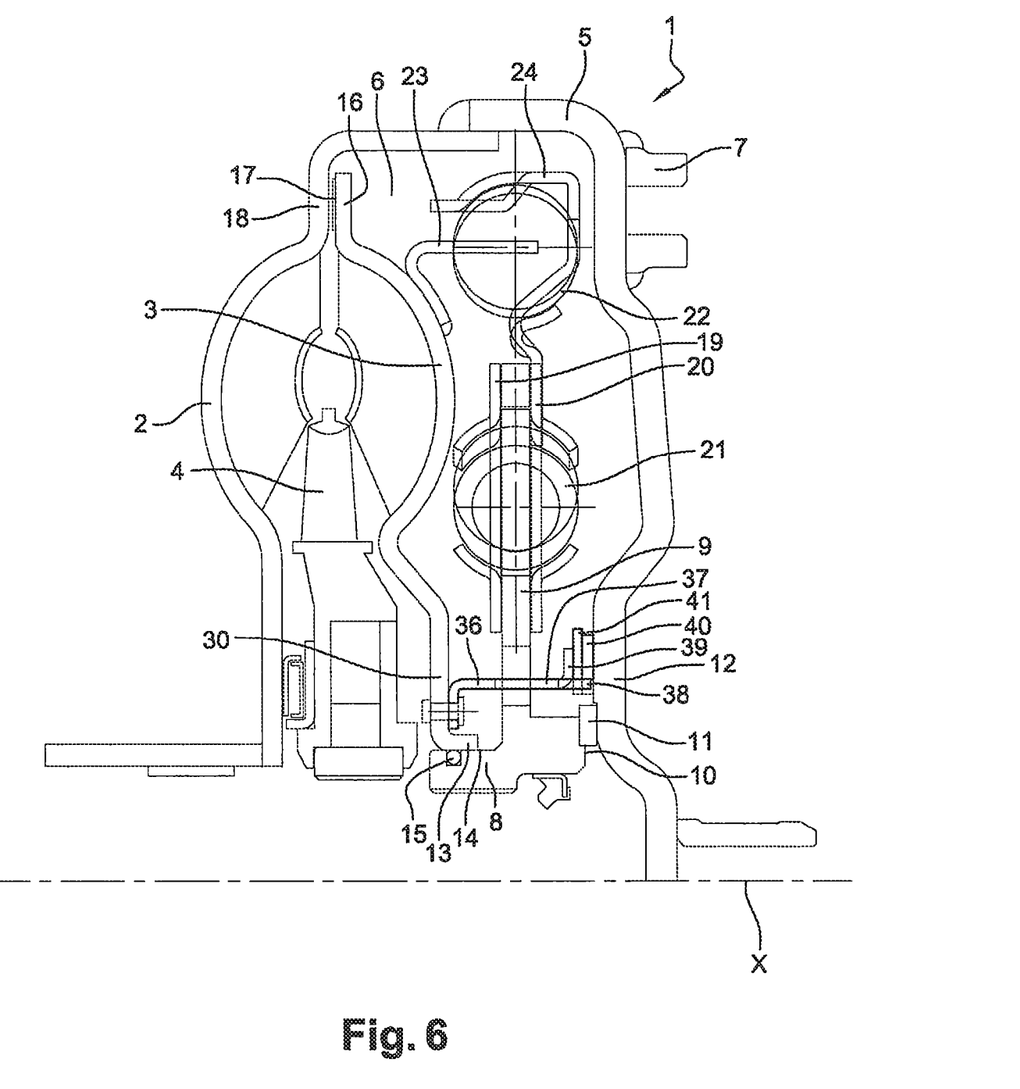
FIG. 6 is a view corresponding to FIG. 1, illustrating a third embodiment of the torque converter according to the invention.
Figure 7:
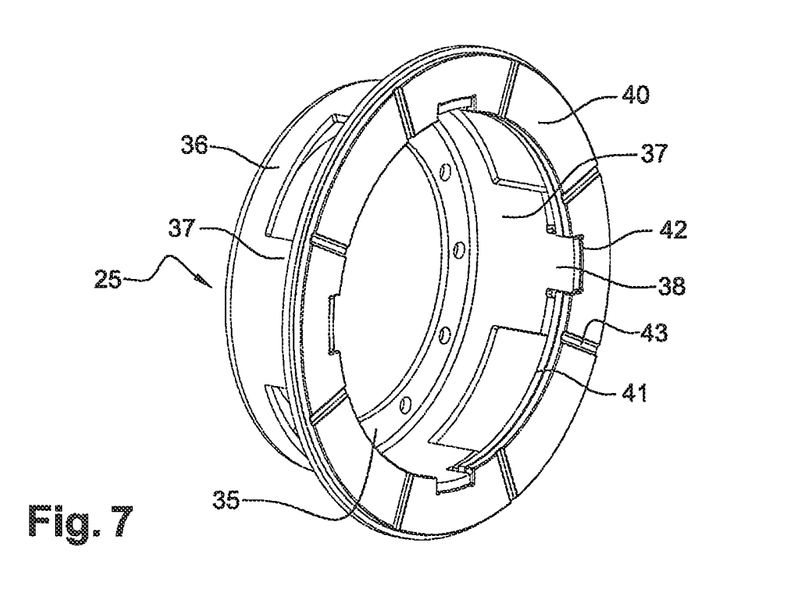
FIG. 7 is a perspective view of the bracing member, of the spacing washer and of the support washer of the torque converter of FIG. 6.
Figure 8:
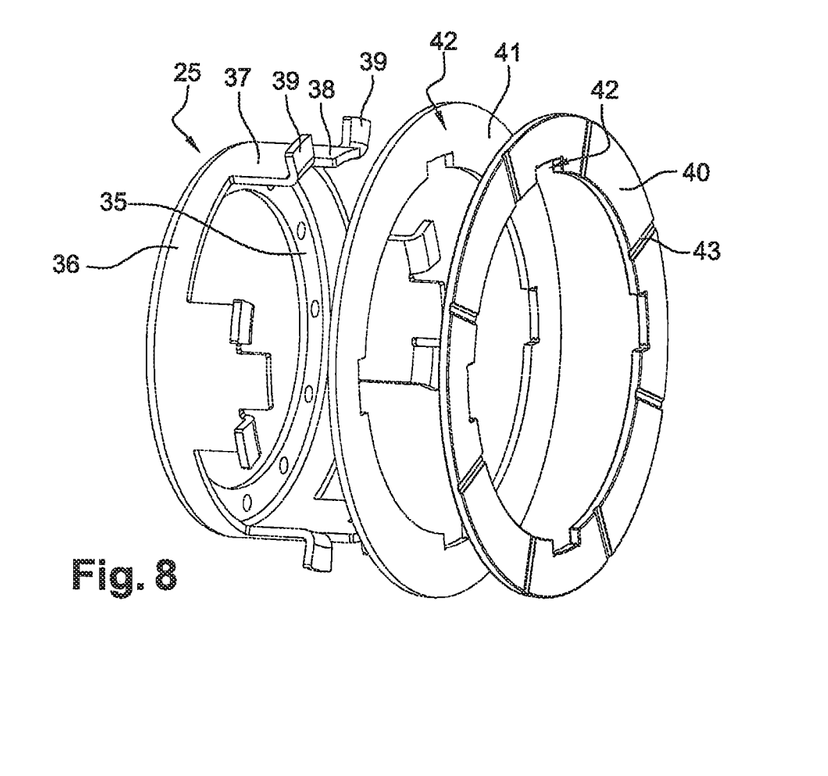
FIG. 8 is a perspective exploded view of the bracing member, of the spacing washer and of the support washer of the torque converter of FIG. 6.

FIGS. 6 to 8 show a torque converter 1 according to a second embodiment, which is different from the one described while referring to FIGS. 1 to 4 in that the bracing member 25 is made from a steel sheet, for instance by drawing.

The bracing member 25 thus comprises a radially extending annular rim 35, positioned at the back and attached to the turbine wheel 3 by rivets or by welding, for instance. A cylindrical part 35 axially extends frontwards from the radially external periphery of the annular rim 35. Lugs 37, here four in number, axially extend frontwards from the free end of the cylindrical part 36. The central part 38 of each lug 37 axially extends whereas side parts of each lug 37 form rest areas 39 positioned on the circumference on either side of each central part 38. Each rest area 39 is formed by an area so folded as to radially extend outwards and form a radial rest surface.

A support washer 40 and a spacing washer 41 are mounted between the bracing member 25 and the cover 5, with the support washer 40 being intended to rest on the cover 5 and the spacing washer 41 being axially inserted between the rest areas 39 and the support washer 40.

The support washer 40 is made of a polymer material, for instance. Besides, the spacing washer 41 can be elastically deformable in the axial direction, so as to make up for the axial motion of the turbine wheel 3. The support washer 40 and the spacing washer 41 may be rotationally coupled with the bracing member. For this purpose, the support washer 40 and the spacing washer 41 comprise notches 42 for example located on the radially internal periphery thereof, with the central areas 38 of the lugs 37 of the bracing member 25 being engaged in a form-fitting manner in said notches 42 so as to provide a rotational coupling of said washers 40, 41 and of the bracing member 25.

The face of the support washer 40 contacting the cover 5 may comprise lines 43, radial lines for instance or lines so oriented as to efficiently lubricate the friction area.

The lugs 37 of the bracing member 25 may of course be oriented backwards, with the above-mentioned washers 40, 41 being then inserted between the rest areas 39 of the lugs 37 and the turbine wheel 3, with the radial rim 35 of the bracing member 25 being attached to the cover 5 by rivets, or by welding, for example.

The invention claimed is:

1. A hydrokinetic torque coupling device (1) for a motor vehicle, comprising an impeller wheel (2) intended to be coupled to a crankshaft and adapted to hydrokinetically rotate a turbine wheel (3), with the impeller wheel (2) being rotationally coupled to a cover (5) at least partially accommodating the impeller wheel (2), the turbine wheel (3) and the reactor (4), with the turbine wheel (3) being adapted to be axially moved between an engaged position in which the turbine wheel (3) and the impeller wheel (2) are axially moved closer to each other and rotationally coupled together, and a disengaged position in which the turbine wheel (3) and the impeller wheel (2) are axially moved away from each other and rotationally uncoupled, wherein said coupling device further comprises a bracing member (25) axially extending between the turbine wheel (3) and a part (12) of the cover (5), with the bracing member (25) being adapted to limit the axial motion of the turbine wheel (3) toward the above-mentioned part (12) of the cover (5), opposite the turbine wheel (3); and damping means (9, 19, 20, 21, 22, 23) mounted between the turbine wheel (3) and a hub (8) intended to be coupled with a transmission input shaft, wherein the damping means comprise an annular wheel disc (9) connected to the hub (8) and a least one guiding washer (19, 20) connected to the turbine wheel (3), with at least a first elastic member, acting on a circumference (21) of said annular wheel disc (9), being mounted between the annular wheel disc (9) and the guiding washer (19, 20), with the first elastic member (21) being adapted to oppose the rotation of the annular wheel disc (9) relative to the guiding washer (19, 20), and, wherein the annular wheel disc (9) comprises at least one oblong opening (32), wherein said opening is passed through by the bracing member (25).

2. A hydrokinetic torque coupling device (1) according to claim 1, wherein the bracing member (25) is attached to the cover (5), to an attachment end, with the turbine wheel (3) being adapted to rest on a rest end of the bracing member (25).

3. A hydrokinetic torque coupling device (1) according to claim 1, wherein the bracing member (25) is attached to an attachment end of the turbine wheel (3), with a rest end of the bracing member (25) being adapted to rest on said part (12) of the cover (5).

4. A hydrokinetic torque coupling device (1) according to claim 2 wherein a pad or a rolling bearing washer (34) is mounted between the rest end of the bracing member (25) and the cover (5) or the turbine wheel (3).

5. A hydrokinetic torque coupling device (1) according to claim 2 wherein a support washer (40) and a spacing washer (41) are mounted between the rest end of the bracing member (25), and the cover (5) or the turbine wheel (3), with the support washer (40) resting on the cover (5) or the turbine wheel (3).

6. A hydrokinetic torque coupling device (1) according to claim 5, wherein the spacing washer (41) is elastically deformable in the axial direction.

7. A hydrokinetic torque coupling device (1) according to claim 5 wherein the support washer (40) and the spacing washer (41) are rotationally coupled with the bracing member (25).

8. A hydrokinetic torque coupling device (1) according to claim 1, wherein the damping means comprise at least one second elastic member (22) mounted between the guiding washer (19, 20) and the turbine wheel (3), with the second elastic member (22) being adapted to oppose the rotation of the turbine wheel (3) relative to the guiding washer (19, 20).

9. A hydrokinetic torque coupling device (1) according to claim 1, wherein the bracing member (25) comprises an annular part (26) from which at least one lug (27) axially extends, with said lug (27) going through the oblong opening (32) of the annular wheel disc (9).

10. A hydrokinetic torque coupling device (1) according to claim 3, wherein a pad or a rolling bearing washer (34) is mounted between the rest end of the bracing member (25) and the cover (5) or the turbine wheel (3).

11. A hydrokinetic torque coupling device (1) according to claim 3, wherein a support washer (40) and a spacing washer (41) are mounted between the rest end of the bracing member (25), and the cover (5) or the turbine wheel (3), with the support washer (40) resting on the cover (5) or the turbine wheel (3).

12. A hydrokinetic torque coupling device (1) according to claim 6, wherein the support washer (40) and the spacing washer (41) are rotationally coupled with the bracing member (25).

\* \* \* \* \*